United States Patent [19]

Bor-Ramensky et al.

[11] Patent Number: 4,981,051

[45] Date of Patent: Jan. 1, 1991

[54] PLANETARY PRECESSION SPEED CHANGING DEVICE

[75] Inventors: Arnold E. Bor-Ramensky, Leningrad; Valery N. Kuznetsov, Leningradskaya; Nikolai I. Kukin, Leningrad; Svetlana V. Kudryashova, Leningrad; Vladimir N. Ivanov, Leningrad; Vladimir K. Skalnov, Leningrad, all of U.S.S.R.

[73] Assignee: Leningradsky Institut Informatiki I Avtomatizatsii, Leningrad, U.S.S.R.

[21] Appl. No.: 283,275

[22] Filed: Nov. 11, 1988

[30] Foreign Application Priority Data

Mar. 27, 1987 [WO] PCT Int'l Appl. .................. PCT/SU87/00041

[51] Int. Cl.⁵ ............................................. F16H 1/28
[52] U.S. Cl. .................................................. 475/163
[58] Field of Search ........................................ 74/800

[56] References Cited

U.S. PATENT DOCUMENTS 1,616,369  2/1927  Hartmann .............................. 74/800
3,258,994  7/1966  Gorfin .................................. 74/800

FOREIGN PATENT DOCUMENTS 92636  10/1959  U.S.S.R. .
205454  1/1968  U.S.S.R. .
343095  8/1972  U.S.S.R. .

Primary Examiner—Dirk Wright
Attorney, Agent, or Firm—Burgess, Ryan & Wayne

[57] ABSTRACT

The speed changing device incorporates a planet wheel (5) located in a housing (1) with provision for oscillating and a planet carrier in the form of a sleeve (7) rigidly attached to an arm (9) at a free end whereof there is fitted a roller (11). A second arm (10) with a roller (12) is symmetrically located in a diametrical plane of the planet wheel (5) so at to make an angle less than 180° with the first arm (9). The sleeve (7) is spring-loaded in the axial direction.

1 Claim, 1 Drawing Sheet

PLANETARY PRECESSION SPEED CHANGING DEVICE

TECHNICAL FIELD

The invention relates to mechanical engineering and instrument manufacture and has specific reference to a planetary precession speed changer finding application in coupling said torque-transmitting mechanisms, such as speed reducing gears of electromechanical modules of automatic actuating systems in particular.

PRIOR ART

In planetary precession speed changers which are known in the art the zone confined whereto are the meshing bevel gears follows a wave-like pattern of motion due to the precession of one of the bevel gears, referred to as planet wheel. Therefore, in some sources such mechanisms are termed gear-type wavy ones with rigid links and are treated as a further development of gear-type wavy mechanisms with flexible links.

Known in the art is a planetary precession speed changing device (SU, A, 343,095) incorporating bevel gears with intersecting axes one thereof is subjected to precession and is constrained by a suspension against revolving about its own axis.

In the primary art speed changer each pair of meshing bevel gears is held fast so as to be statically determinate in space (each one individually) but a point of engagement therebetween renders statically indeterminate the entire device. As a result, a backlash is brought about between the gears in mesh in case of wear on teeth or inaccurate fitting up.

Also known is a planetary speed changer of the gear type incorporating a housing; a pressure plate with balls which is secured to a driving shaft so as to form an angle with an axis of revolution of an output shaft; a movable gear (planet wheel) which is supported on a ball bearing and is subjected to a precessional motion, being constained against revolution about its own axis by a cylindrical pin engaging a guiding groove in the housing; a bevel gear which is secured to the output shaft and meshes the planet wheel.

To have knowledge of the way in which the above speed changer operates, consider a simplified version thereof wherein a planet carrier with a pressure roller contacting the precessional gear within one zone only is substituted for the pressure plate with the balls. The, the planet wheel which is secured to the ball bearing loses three degrees of freedom. The planet carrier with the rollers which imparts motion to the planet wheel deprives this of two degrees of freedom and the constraining pin—of one degree of freedom more (refers to the rotation about its own axis). All in all, the prior art planet wheel is deprived of six degrees of freedom and can be treated as a statically determinate in space. However, one more link the planet wheel is exposed to at a point of engagement with the bevel gear which is attached to the output shaft is a superfluous one. It renders the whole system statically indeterminate.

This effect brings about an unavoidable backlash between the gears after some wear thereon even if no backlash existed during the fitting up. This invites inaccurate performance and shortens the service life of the speed changer.

The prototype features the planet carrier in the form of a disc with balls. However, the position of the precessional gear is an unstable one due to the planet carrier being rigidly attached to the shaft and the centre of the precessional gear is secured to the ball bearing. This unstability is reflected by an uncertain position of the precession gear relative to the position of the pressure disc which leads to a clearance being set up between the gear and planet carrier. This clearance combined with the backlash brings about inaccurate performances of the device and shortens its service life.

It is an object of the present invention to eliminate the drawbacks inherent in the prior art devices.

SUMMARY OF THE INVENTION

The principal object of the invention is to provide a planetary precession speed changing device wherein the planet carrier is designed so as to eliminate clearance, backlash included, and enhance thereby the accuracy of performance and extend the service life of the device which may also be used in torque-transmitting applications.

This object is realized by disclosing a planetary precession speed changing device incorporating a housing, a bevel gear located in the housing and connected to an output shaft, a planet wheel located in the housing with provision for oscillating and meshing the bevel gear, a planet carrier fitted to an input shaft and consisting of a sleeve and an arm rigidly linked thereto, a roller fitted to a free end of the arm so as to press the planet wheel against the bevel gear wherein according to the invention a second arm with a roller is located in a diametrical plane of the planet wheel symmetrically with he first arm so as to make therewith an angle less than 180°, and the sleeve is spring-loaded in the axial direction.

This arrangement eliminates the possibility of backlash to come into play in the event of wear or inaccurate fitting up and also prevents a springy clearance to be set up under high loads. It provides thus for high accuracy and long service life of the speed changer when this is used in coupling and torque-transmitting mechanism.

The essence of the invention consists in that the spring-loaded planet carrier ensures a clearanceless contact between the plane wheel and the meshing bevel gear fitted to the output shaft. No backlash can ever exist in this case in principle.

The fact that use is made of two, and only two, rollers enables the position of the planet wheel to be determined in space by three points: two points $A_1$, $A_2$ of the contact with the rollers and an imaginary point which is the pole of precessional motion of the planet wheel. Certainty is assured in all those cases when the angle the arms with the rollers make with each other is less than 180° and the points of support are outside a straight line. Under the circumstances, the planet wheel cannot move when the planet carrier is at rest, and no springy clearance can be brought about if a flexible link, i.e. spring, is introduced into the device.

The treatment of similar speed changers by various sources, as pointed out hereinabove, as wavy mechanisms with rigid links representing a further development of wavy mechanisms with flexible links is based on the fact that the conventional (non-wavy) speed changers of the gear type are practically the last word from the standpoint of accuracy within the existing frontiers of manufacturing practices. The object of the developing effort is to eliminate the main drawback of the wavy speed changers with flexible links, which is a limited service life, without sacrificing the accuracy requirements beyond a possible minimum.

The disclosed speed changer features all assets of wavy mechanisms with flexible links but surpasses these in terms of durability by two or three orders of magnitude. This creates the prospect of designing high-speed and compact speed changers of the gear type with an inherently high kinematic accuracy which operate smoothly without backlash characterizing load motion of the drive.

Freedom from springly clearance renders the device suitable of ruse in torque-transmitting applications. Therefore, it may be utilized in mechanical engineering as well as instruments and control systems.

BRIEF DESCRIPTION OF THE DRAWINGS

What follows is a detailed specification of the disclosed invention which should be read in conjunction with the accompanying drawings wherein.

BEST MODE OF CARRYING OUT THE INVENTION

Figure 1:
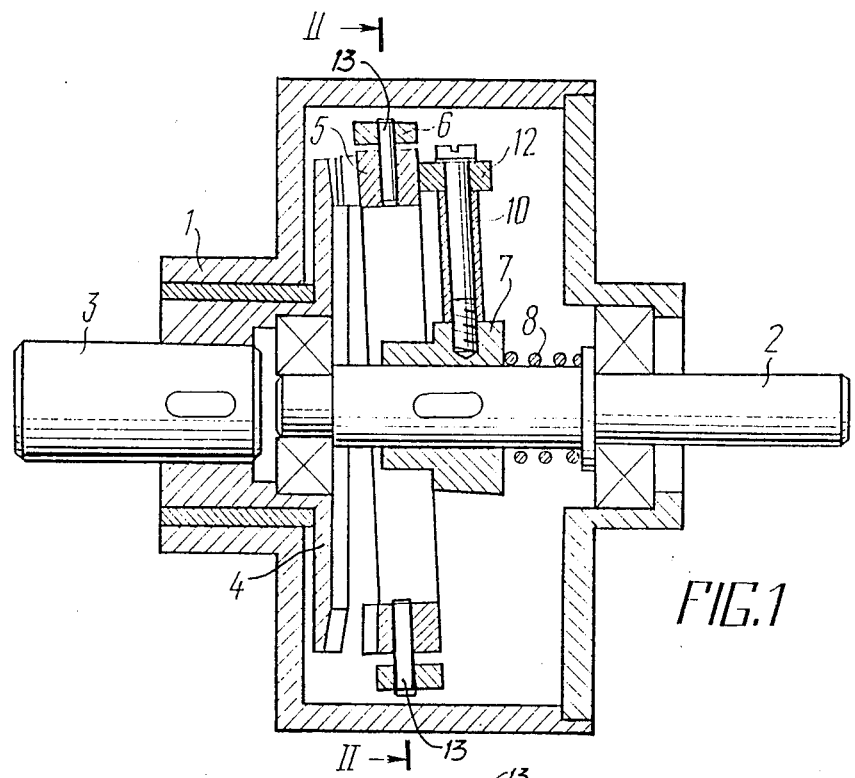
FIG. 1 is a cross sectional view of the planetary precession speed changing device according to the invention.

Referring to FIG. 1, the planetary precession speed changing device incorporates a housing 1, an input shaft 2 and an output shaft 3 disposed in alignment with each other, a bevel gear 4 connected to the output shaft 3 and meshing a planet wheel 5 located in the housing 1 with provision for oscillating with the aid, for example, of a gimbal suspension 6. Also incorporated is a planet carrier in the form of a sleeve 7, acted upon in the axial direction by a spring 8, and two arms 9 and 10 which are rigidly attached to the sleeve 7 and have each rollers 11, 12, respectively, at their free ends.

Figure 2:
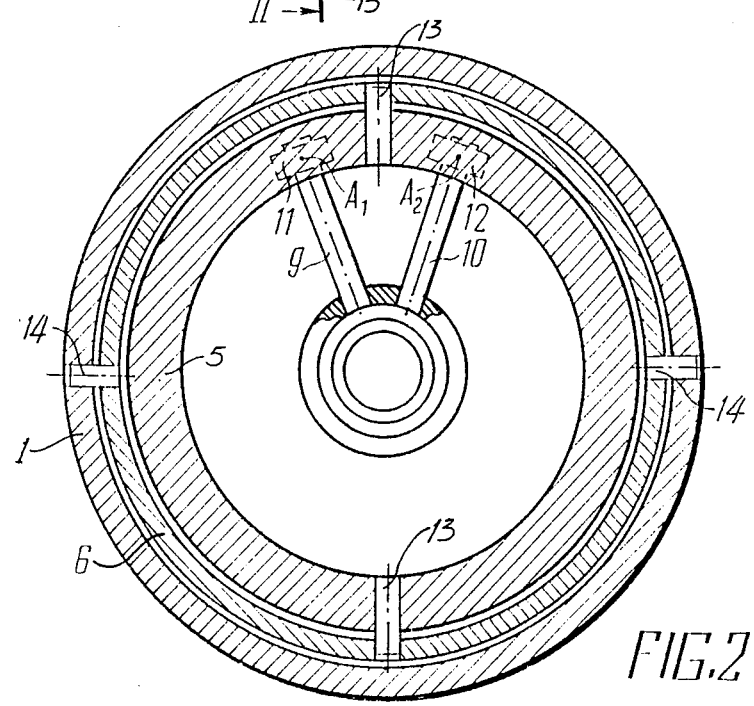
FIG. 2 is a section on line II—II of FIG. 1.

Referring to FIG. 2, the arms 9, 10 are located symmetrically in diametrical planes of the plane wheel 5 and make an angle less than 180° with each other. The gimbal suspension 6 is connected to the plane wheel 5 by means of a pin 13, and to the housing 1 by means of a pin 14 arranged to be located normal with respect to pin 13.

In operation, an external torque applied to the input shaft 2 is transmitted to the planet carrier the rollers 11, 12 whereof act on he planet wheel 5 so that this engages the bevel gear 4 without clearance, backlash being up as well.

Owing to the rollers 11, 12, the plane wheel 5 has three points of support—the points $A_1$, $A_2$ of contact with the rollers and the imaginary point, i.e. the pole of the precessional motion of the plane wheel 5—which prevent it from revolving around the bevel gear 4 in a certain angular position relative to the axis of its instantaneous rotation which is decided by the angular position of the planet carrier and consequently that of the input shaft 2. No springy clearance can ever exist in this case. The planet wheel 5 and the bevel gear 4 differ by the number of their teeth. Therefore, in response to a full revolution of the planet carrier, the bevel gear 4 turns with respect to the planet wheel 5 through an angle corresponding to the difference between the number of teeth thereof. Since the gimbal suspension 6 constrains the planet wheel 5 against revolving about its own axis, set into rotary motion, with a speed reduction with respect to the input shaft 2, the bevel gear 4 and the output shaft 3.

INDUSTRIAL APPLICABILITY

The planetary precession speed changing device provides for a clearanceless transmission of torque from a drive to an actuator with a speed reduction as high as 300 to 1 in a single stage. Such speed changers can be used to advantage in servo systems but it is also practical to employ them as torque-transmitting means in various fields of mechanical engineering.

What is claimed:

1. A planetary precession speed changing device incorporating a housing (1), a bevel gear (4) located in the housing (1) and connected to an output shaft (3), a planet wheel (5) located in the housing (1) with provision for oscillating it and meshing with the bevel gear (4), a planet carrier fitted to an input shaft (2) and consisting of a sleeve (7) and an arm (9) rigidly linked thereto, a roller (11) fitted to a free end of the arm (9) so as to press the planet wheel (5) against the bevel gear (4) characterized in that a second arm (10) with a roller (12) is located in a diametrical plane of the planet wheel (5) symmetrically with the first arm (9) so as to make therewith an angle less than 180° C., and the sleeve (7) is spring-loaded in the axial direction.

* * * * *